US011880359B2

(12) United States Patent
Furihata et al.

(10) Patent No.: US 11,880,359 B2
(45) Date of Patent: Jan. 23, 2024

(54) WORK ASSISTANCE SYSTEM, WORK ASSISTANCE APPARATUS, WORK ASSISTANCE METHOD, AND STORAGE MEDIUM

(71) Applicant: Yokogawa Electric Corporation, Tokyo (JP)

(72) Inventors: Ryouhei Furihata, Musashino (JP); Masahisa Saito, Musashino (JP); Ryuta Motooka, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/211,309

(22) Filed: Mar. 24, 2021

(65) Prior Publication Data

US 2021/0303556 A1    Sep. 30, 2021

(30) Foreign Application Priority Data

Mar. 30, 2020 (JP) ................................. 2020-059781

(51) Int. Cl.
*G06F 16/245* (2019.01)
*G06F 16/23* (2019.01)

(52) U.S. Cl.
CPC ........ *G06F 16/245* (2019.01); *G06F 16/2379* (2019.01)

(58) Field of Classification Search
CPC .............. G06F 16/245; G06F 16/2379; G06F 16/24573; G06F 16/25; G06Q 10/06; G06Q 10/0637; G06Q 10/20
See application file for complete search history.

(56) References Cited

U.S. PATENT DOCUMENTS

| | | | |
|---|---|---|---|
| 2007/0282817 A1 | 12/2007 | Okuno et al. | |
| 2011/0238375 A1 | 9/2011 | Fujisaki | |
| 2015/0160816 A1* | 6/2015 | Furihata | .............. H04L 41/22 |
| | | | 715/736 |
| 2015/0222674 A1* | 8/2015 | Jinguu | .............. G06F 16/22 |
| | | | 709/204 |
| 2016/0342672 A1* | 11/2016 | Fukui | .............. G06F 16/1827 |
| 2017/0232816 A1* | 8/2017 | Kullen | .............. B60H 1/00064 |
| | | | 165/59 |
| 2017/0262816 A1* | 9/2017 | Furihata | .............. G06Q 10/20 |
| 2019/0302722 A1* | 10/2019 | Nozaka | .............. G05B 19/0425 |

FOREIGN PATENT DOCUMENTS

| | | |
|---|---|---|
| CN | 104636868 A | 5/2015 |
| CN | 108701268 A | 10/2018 |
| EP | 3217337 A1 | 9/2017 |
| JP | H10187812 A | 7/1998 |
| JP | 2005352848 A | 12/2005 |
| JP | 2007-323395 A | 12/2007 |
| JP | 2011-203775 A | 10/2011 |
| JP | 6519901 B1 | 5/2019 |

* cited by examiner

*Primary Examiner* — James E Richardson
(74) *Attorney, Agent, or Firm* — Rankin, Hill & Clark LLP

(57) ABSTRACT

A work assistance system includes a storage storing work data for each of a plurality of devices, the work data indicating work performed to maintain the plurality of devices, a setter configured to set at least one attribute among a plurality of prescribed attributes with respect to the work data stored in the storage, an extractor configured to interpret the attribute set in the work data and to extract work data in which a specific attribute is set, and a provider configured to provide the work data extracted by the extractor.

6 Claims, 12 Drawing Sheets

WORK ASSISTANCE SYSTEM, WORK ASSISTANCE APPARATUS, WORK ASSISTANCE METHOD, AND STORAGE MEDIUM

BACKGROUND OF THE INVENTION

Field of the Invention

The present invention relates to a work assistance system, a work assistance apparatus, a work assistance method, and a storage medium.

Priority is claimed to Japanese Patent Application No. 2020-059781, filed Mar. 30, 2020, the content of which is incorporated herein by reference.

Description of Related Art

In general, in plants, factories, and the like (hereinafter generally simply referred to as "plants"), maintenance is performed regularly or irregularly from the viewpoint of prevention of abnormal operations, maintenance of performance, and the like. For example, in plants in which a distributed control system (DCS) is constructed, maintenance (device maintenance) for on-site devices (a measurement device and an operation device) called field devices is performed regularly or irregularly.

Work, which is performed in the device maintenance, is roughly divided into on-site work and management work. The on-site work is work performed by a worker going to a site where the field device is installed and using an on-site work terminal apparatus (an on-site work tool). Examples of the on-site work include work such as confirmation of a state of a field device and various types of settings for the field device. On the other hand, the management work is work performed by the worker extracting work data stored in the on-site work terminal apparatus and using a management work terminal apparatus (a management work tool). Examples of this management work include work such as confirmation of on-site work which has been performed and generation of a report. The on-site work and the management work may be performed by the same worker.

In Japanese Unexamined Patent Application, First Publication No. 2011-203775, an apparatus in the related art for use in maintenance of a field device is disclosed. In this apparatus, only parameters which a manager determined to be capable of being displayed among the parameters provided in the field device are displayed. Thereby, because a worker who performs the on-site work does not have to find the parameters to be changed from among all the parameters, the burden thereof is reduced.

SUMMARY

The on-site work tool in the related art for use in the above-described on-site work outputs all the work data obtained in the past in units of field devices. Thus, when the work data of a plurality of field devices is required in the above-described management work, it is necessary to incorporate all the work data obtained in the past for the plurality of field devices into the management work tool. Because it is necessary for the worker of the management work to find the necessary work data from a significant amount of work data incorporated into the management work tool, there is a problem in that an error is likely to occur and work efficiency is low.

One aspect of the present invention provides a work assistance system, a work assistance apparatus, a work assistance method, and a storage medium capable of improving work efficiency while preventing an error from occurring in work which is performed in device maintenance.

A work assistance system (1) according to a first aspect of the present invention may include a storage (13, 23) storing work data (WD1, WD2) for each of a plurality of devices (FD), the work data indicating work performed to maintain the plurality of devices, a setter (14b-1, 24a-1) configured to set at least one attribute among a plurality of prescribed attributes with respect to the work data stored in the storage, an extractor (14b-2, 24a-2) configured to interpret the attribute set in the work data and to extract work data in which a specific attribute is set, and a provider (12, 22) configured to provide the work data extracted by the extractor.

According to the one aspect of the present invention, there is an effect that work efficiency can be improved while preventing an error from occurring in work which is performed in device maintenance.

DETAILED DESCRIPTION OF THE INVENTION

Figure 1:
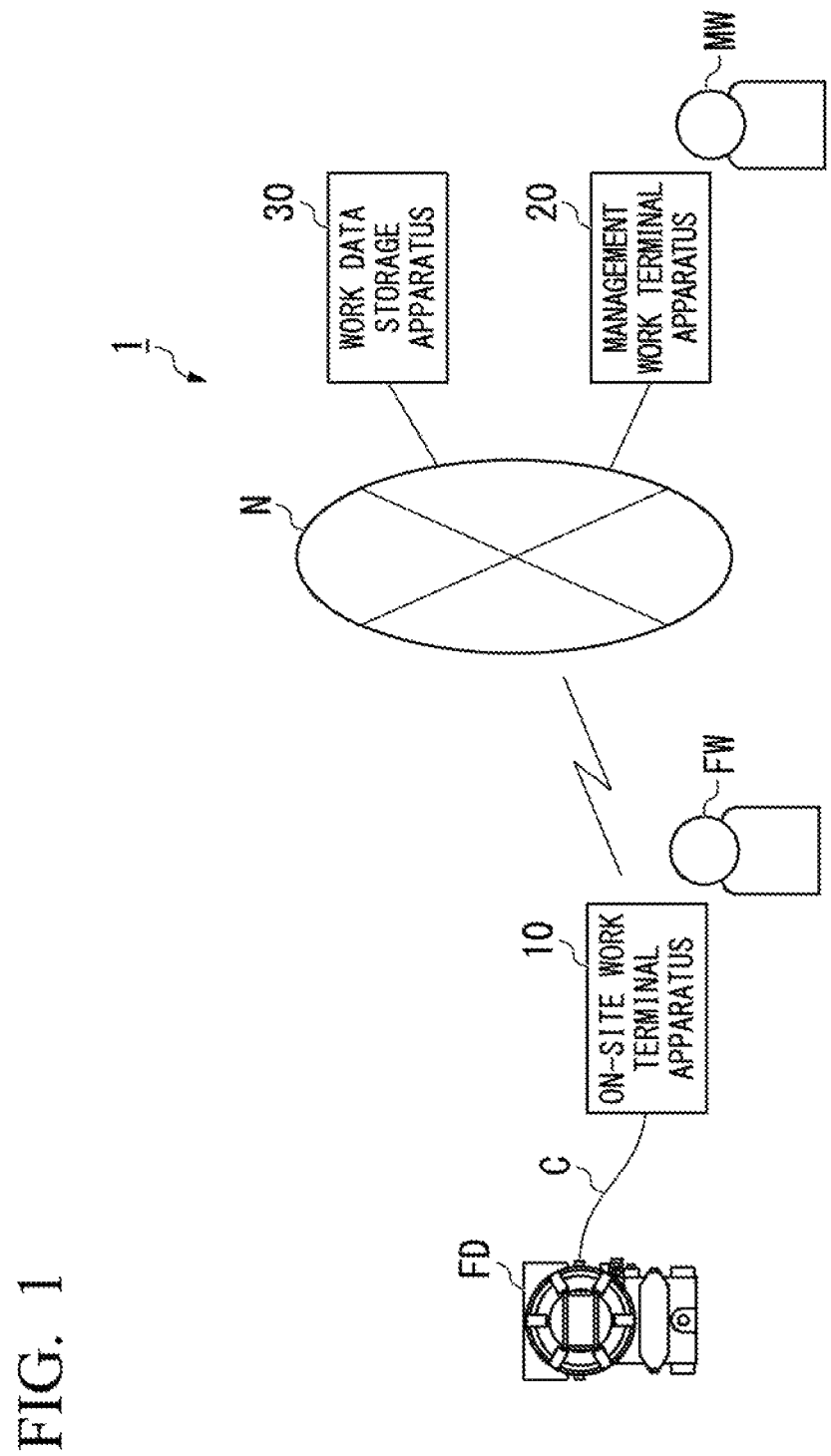
FIG. 1 is a block diagram showing an overall configuration of a work assistance system according to a first embodiment of the present invention.

Hereinafter, a work assistance system, a work assistance apparatus, a work assistance method, and a storage medium according to the embodiment of the present invention will be described in detail with reference to the drawings. Hereinafter, an overview of the embodiments of the present invention will be first described and then the details of the embodiments of the present invention will be described.

Overview

Embodiments of the present invention make it possible to improve work efficiency while preventing an error from occurring in management work of device maintenance. The conventional on-site work tool in the related art for use in on-site work of device maintenance has a specification for outputting all work data obtained in the past in units of devices. Thus, when work data of a plurality of devices is required in the management work of the device maintenance, it is necessary to incorporate all work data obtained in the past for the plurality of devices into a management work tool. A worker of the management work needs to find necessary work data from a significant amount of work data incorporated into the management work tool.

As described above, it is necessary to incorporate all the work data obtained in the past for a plurality of devices into the management work tool. Thus, in the management work tool, the processing load for incorporating the work data is high. In addition, the management work tool runs out of capacity in a storage location (for example, a memory) of the incorporated work data.

Plants are often managed in units such as areas and units where a plurality of devices are installed and there are some cases where the same identification information (tag name) for identifying devices is used between these areas and units. For example, in two areas where similar devices are installed in parallel for the purpose of improving production capability, there are some cases where the same identification information is used for the corresponding devices in the areas. In this case, it is difficult to specify a certain device from the devices in which the same identification information is used.

In this manner, conventionally, a specification for outputting work data in units of devices from an on-site work tool to a management work tool is provided and a large amount of unnecessary work data for the purpose of specific management is incorporated into the management work tool. Thus, in the management work, it is necessary to find the necessary work data from a significant amount of work data, an error is likely to occur and work efficiency is low. Also, the processing load for incorporating the work data into the management work tool becomes large and the capacity of the storage location for the incorporated work data becomes insufficient. Also, when the same identification information is used for different devices, there are some cases where work data, which is difficult to distinguish between different devices, is incorporated into the management work tool and an error occurs.

In the embodiment of the present invention, work data indicating the work performed to maintain the device is stored for each device and at least one attribute among a plurality of prescribed attributes is set with respect to the stored work data. Next, the work data in which the specific attribute is set is extracted by interpreting the attribute set in the work data and the extracted work data is provided.

Thereby, because only the work data for which the specific attribute is set (for example, work data required for the purpose of specific management) is extracted and displayed, it is possible to improve work efficiency while preventing an error from occurring in management work of device maintenance. Also, the processing load for incorporating the work data into the management work tool can be reduced and a shortage of capacity in the storage location of the incorporated work data can be reduced.

First Embodiment

<Work Assistance System>

FIG. 1 is a block diagram showing an overall configuration of a work assistance system according to a first embodiment of the present invention. As shown in FIG. 1, a work assistance system 1 of the present embodiment includes an on-site work terminal apparatus 10 (a first terminal apparatus), a management work terminal apparatus 20 (a second terminal apparatus), and a work data storage apparatus 30 (a storage apparatus). This work assistance system 1 assists work (particularly, management work) which is performed in maintenance of a field device FD (a device).

The on-site work terminal apparatus 10, the management work terminal apparatus 20, and the work data storage apparatus 30 are communicatively connected via the network N. For example, the on-site work terminal apparatus 10 is wirelessly connected to the network N and the management work terminal apparatus 20 and the work data storage apparatus 30 are connected to the network N by wires. The connection form of the on-site work terminal apparatus 10, the management work terminal apparatus 20, and the work data storage apparatus 30 is arbitrary.

The field devices FD are, for example, sensor devices such as a flow meter and a temperature sensor, valve devices such as a flow control valve and an on-off valve, actuator devices such as a fan and a motor, and other devices installed in a plant site. A plurality of field devices FD are installed in the plant and are managed (controlled) by a controller (not shown) in a centralized manner. The field device FD can perform communication with the on-site work terminal apparatus 10 when the on-site work terminal apparatus 10 is connected via a cable C or when the field device FD has a communication connection based on short-range wireless communication.

Plants where field devices FD are installed include a plant that manages and controls a wellhead such as a gas field or an oil field and its surroundings, a plant that manages and controls power generation such as hydro, thermal, and nuclear power generation, a plant that manages and controls environmental power generation such as solar or wind power generation, and a plant that manages and controls water and sewage, a dam, or the like, in addition to an industrial plant for chemicals or the like. The above-described plants are merely examples and there is no limitation to the above-described plants. For example, the present invention can be applied to acquire and manage work data for devices installed for maintenance of buildings, bridges, tunnels, and the like.

The on-site work terminal apparatus 10 is a portable terminal apparatus used by an on-site worker FD who performs on-site work at the site of a plant where a field device FD is installed. The on-site work terminal apparatus 10 is connectable to the field device FD via the cable C. The on-site work terminal apparatus 10 communicates with the field device FD via the cable C, acquires parameters set in the field device FD, sets parameters for the field device FD, calibrates the field device FD, and the like. Details of the on-site work terminal apparatus 10 will be described below.

The management work terminal apparatus 20 is, for example, a terminal apparatus installed in the office of the management worker MW who performs the management work and used by the management worker MW. The management work terminal apparatus 20 does not necessarily have to be portable, unlike the on-site work terminal apparatus 10. The management work terminal apparatus 20 is used to acquire the work data obtained by the on-site work terminal apparatus 10 and perform the confirmation of the on-site work that has been performed, the generation of a report, and the like. Details of the management work terminal apparatus 20 will be described below.

The work data storage apparatus 30 is an apparatus that stores work data exchanged between the on-site work terminal apparatus 10 and the management work terminal apparatus 20. Although not shown in FIG. 1, most of the on-site work in the plant is performed by a plurality of on-site workers FW using the on-site work terminal apparatus 10. The work data storage apparatus 30 stores pieces of work data individually output from a plurality of on-site work terminal apparatuses 10. The work data storage apparatus 30 may be implemented by cloud computing. When work data is directly exchanged between the on-site work terminal apparatus 10 and the management work terminal apparatus 20, the work data storage apparatus 30 can be omitted.

<On-Site Work Terminal Apparatus>

Figure 2:
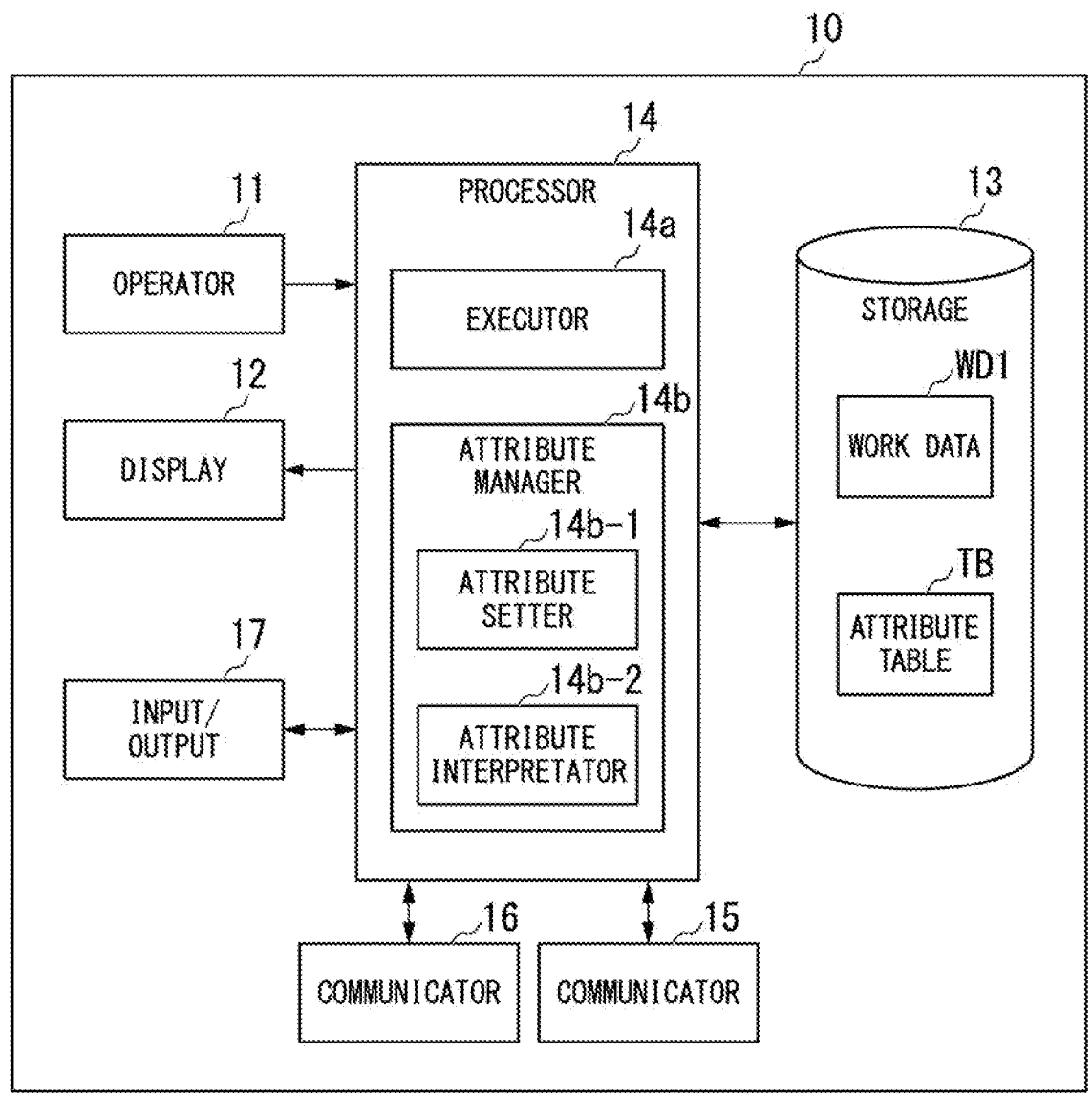
FIG. 2 is a block diagram showing a main configuration of an on-site work terminal apparatus according to the first embodiment of the present invention.

FIG. 2 is a block diagram showing a main configuration of the on-site work terminal apparatus according to the first embodiment of the present invention. As shown in FIG. 2, the on-site work terminal apparatus 10 includes an operator 11, a display 12 (a provider), a storage 13, a processor 14, a communicator 15, a communicator 16, and an input/output 17. The on-site work terminal apparatus 10 is implemented by, for example, a notebook type or tablet type computer.

The operator 11 includes an input apparatus such as a keyboard or a pointing device and outputs an instruction according to an operation of an on-site worker who uses the on-site work terminal apparatus 10 (an instruction for the on-site work terminal apparatus 10) to the processor 14. For example, the display 12 includes a display apparatus such as a liquid crystal display apparatus, and displays various types of information output from the processor 14. The operator 11 and the display 12 may be physically separated or may be physically integrated as in a touch panel type liquid crystal display apparatus having both a display function and an operation function.

For example, the storage 13 includes an auxiliary storage apparatus such as a hard disk drive (HDD) or a solid-state drive (SSD) and stores various types of information. The storage 13 stores, for example, work data WD1 and an attribute table TB. The work data WD1 is data indicating the work performed to maintain the field device FD. The attribute table TB is a table in which prescribed attributes that can be set in the work data are stored.

Figure 3:
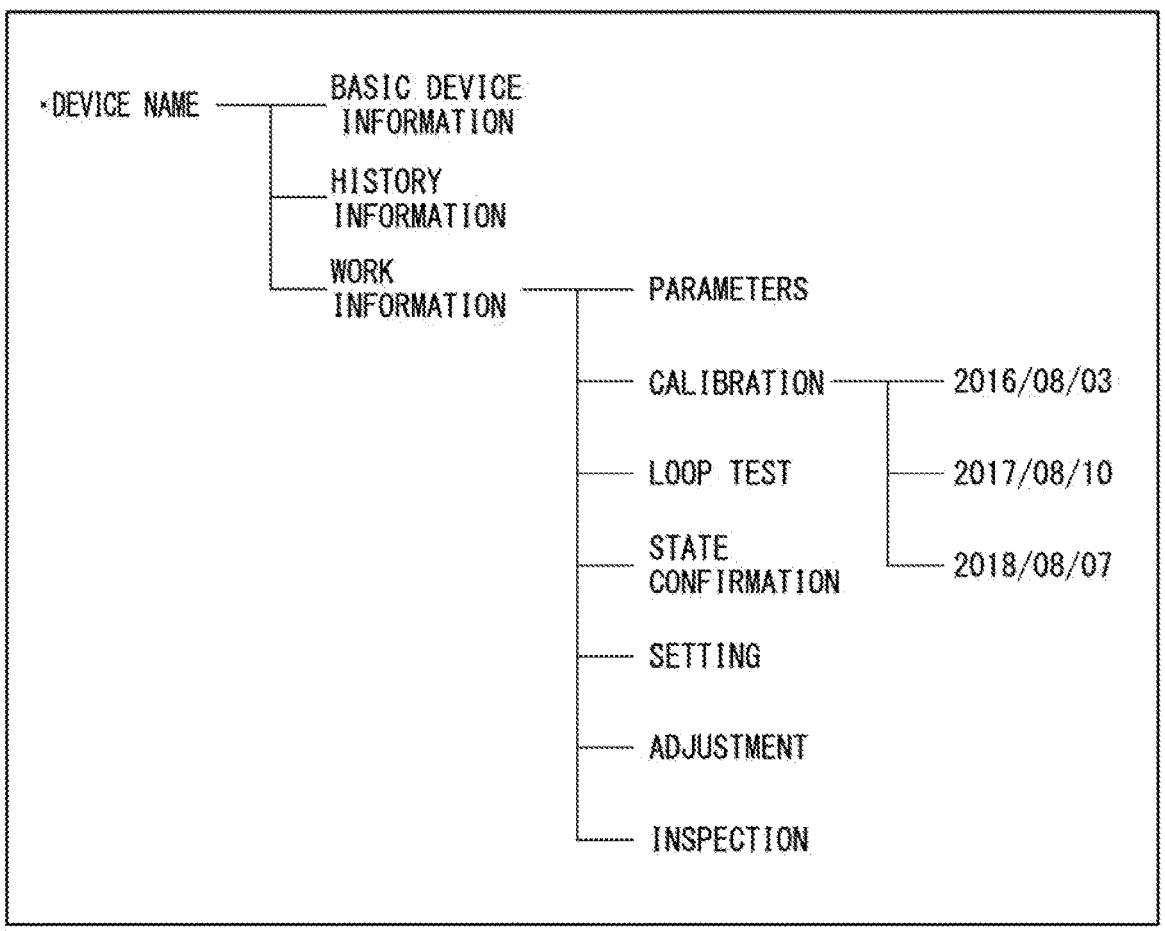
FIG. 3 is a diagram showing a data structure of work data according to the first embodiment of the present invention.

FIG. 3 is a diagram showing a data structure of work data according to the first embodiment of the present invention. As shown in FIG. 3, work data WD1 is data in which a device name (identification information) of the field device FD is associated with basic device information (device information), history information, and work information. The work data WD1 may be data in which only the work information is associated with the device name of the field device FD. The work data WD1 includes a plurality of data elements having the structure shown in FIG. 3 for each of device names of the field devices FD.

The device name of the field device FD is information given to the field device FD to identify the field device FD. The device name of the field device FD includes, for example, a device tag preset in the field device FD and the like. In the on-site work terminal apparatus 10, the work data WD1 is basically managed on the basis of the device name of the field device FD.

The basic device information is information for specifying the field device FD. Examples of the basic device information include information indicating a device name (a tag name), a model (a model name), a manufacturing company, a uniquely determined unique number added at the time of manufacturing, and the like of the field device FD. The history information is information indicating a history of work performed to maintain the field device FD. The history information is, for example, information indicating a summary of the work performed to maintain the field device FD and information indicating operation content of the on-site work terminal apparatus 10 arranged in time series.

The work information is information indicating content of work performed to maintain the field device FD. In this work information, as the content of the work performed to maintain the field device FD, for example, as shown in FIG. 3, "parameters," "calibration," "loop test," "state confirmation," "setting," "adjustment," "inspection," and the like may be included.

When a plurality of types of work have been performed on the field device FD, the work information includes information indicating content of the plurality of types of work. For example, when "calibration" and "loop test" have been performed on a certain field device FD, "work" associated with the field device FD includes information indicating content of the work of the "calibration" and information indicating content of the work of "loop test".

When specific work has been performed a plurality of times with respect to a certain field device FD, the work information associated with the field device FD includes information indicating work content for each date and time when the specific work has been performed. For example, as shown in FIG. 3, when the work of the "calibration" for the field device FD was performed on 2016 Aug. 3, 2017 Aug. 10, and 2018 Aug. 7, the work information associated with the field device FD includes information indicating the work content of "calibration" for each date and time. The information indicating the work content may include results of the work.

Figure 4:
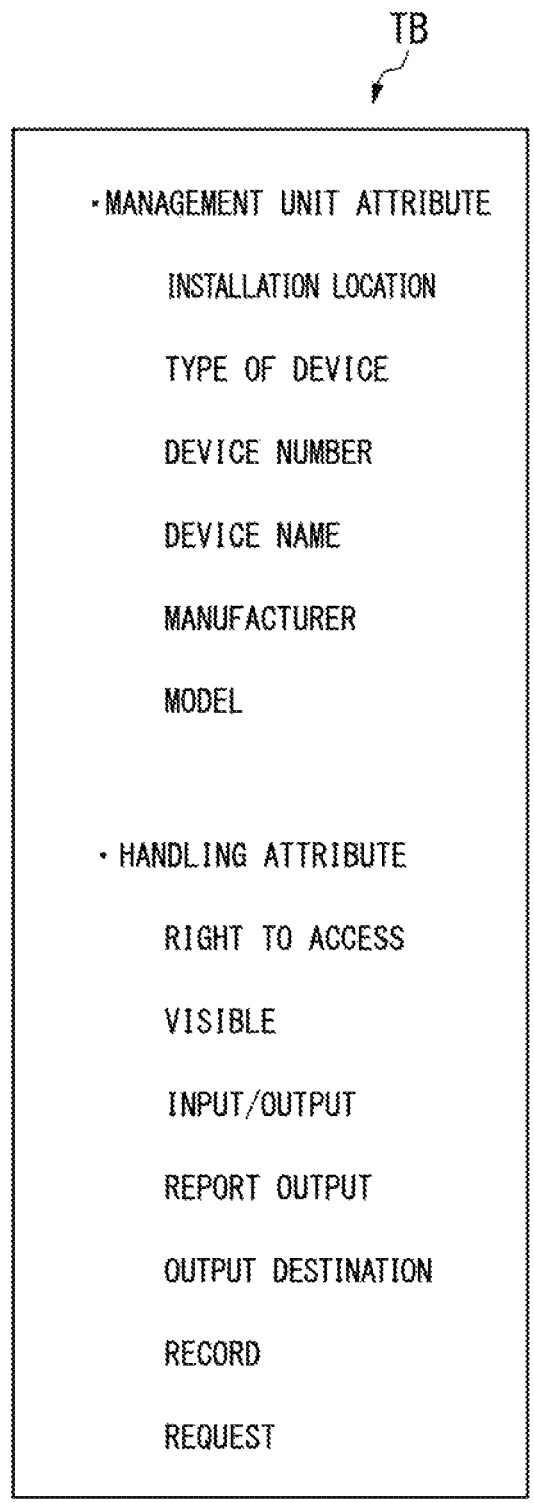
FIG. 4 is a diagram showing an example of an attribute table according to the first embodiment of the present invention.

FIG. 4 is a diagram showing an example of an attribute table according to the first embodiment of the present invention. As shown in FIG. 4, the attributes stored in the attribute table TB include a management unit attribute (a first attribute) indicating the management unit of the field device FD and a handling attribute (a second attribute) that defines the handling of the work data WD1.

Management unit attributes indicating the management unit of the field device FD include "installation location", "type of device", "device number", "device name", "manufacturer", "model", and the like. The attribute "installation location" indicates the installation location of the field device FD (i.e., a location to which the field device FD belongs) and may indicate a logical layer of a plant as well as a physical position in the plant. This attribute "installation location" is defined by a predetermined specific string such as, for example, a "ZZ unit in a YY area in an XX plant."

The attribute "type of device" indicates the type of field deice FD (i.e., a type of quantity that is measured by the field device FD). As this attribute "type of device" for example, a pressure gauge, a flow meter, a thermometer, a level meter, and the like are defined. The attribute "device number" indicates a number for specifying the field device FD. As the attribute "device number," for example, a number unique to the field device FD, a temporary serial number, or another number is defined.

The attribute "device name" indicates a name set in the field device FD. As the attribute "device name", for example, a tag name is defined with reference to a type, a role, a management number, or the like of the field device FD. For example, when the type of the field device FD is a pressure gauge (for measuring the pressure), the type of field device FD is transmission (transmit), and the management number of the field device FD is "001", the tag name of "PT-001" is defined.

The attribute "manufacturer" indicates a manufacturer of the field device FD. As this attribute "manufacturer," for example, a unique name such as "XX Corporation" or "YY Corporation" is defined. The attribute "model" indicates a model of the field device FD. In this attribute "model," types of components of the field device FD and the like as well as a type of the field device FD and installed components of the field device FD can be defined. For example, a string "EJA110J-DMS1G-81" obtained by adding a string "-DMS1G-81" indicating a type of component (material of a wetted part) of the field device FD to a string "EJA110J" indicating a model of the field device FD can be defined as the attribute "model."

Handling attributes that define the handling of work data WD1 include "right to access," "visible," "input/output," "report output," "output destination," "record," "request," and the like. The attribute "right to access" indicates whether or not it is possible to refer to or edit work data which this attribute is set. The attribute "visible" indicates whether or not it is possible to confirm the existence of work data in which this attribute is set. The attribute "input/output" indicates whether or not the work data in which this attribute is set can be output to outside or input from outside.

The "report output" indicates whether or not work data in which the above attribute is set can be included in the work report. Examples of the work data included in the work report include a work requester, a work report submission date, a unit name, a type of device, a device name, a manufacturer, an installation location, a test date, a device number, a model, a temperature, a test device, a worker, a work company, and the like. The "output destination" indicates, for example, an output location of work data in which the attribute "input/output" is set. As the output destination, a specific address or a device such as a universal serial bus (USB) device can be specified.

The "record" indicates whether or not the work data in which the attribute thereof is set is to be recorded. The "request" indicates whether or not the checking, approval, or the like of the work data in which the attribute thereof is set is to be requested. This attribute "request" is set in data required to be checked or approved within the work data when any person (for example, a management worker MW) is requested to check or approve the work data.

This attribute is set, for example, in the device name of the field device FD shown in FIG. 3. Alternatively, the attribute can be individually set for at least one of the device name, the basic device information, the history information, and the work information of the field device FD shown in FIG. 3. For example, because the above-described a attribute "installation location" is information unique to the field device FD, the attribute is set in the device name of the field device FD shown in FIG. 3. Because the above-described "right to access" or "input/output" may need to be controlled for data included in the work data WD1, it can be individually set with respect to at least one of the device name, the basic device information, the history information, and the work information of the field device FD.

The attributes set in the higher-order data of the work data are valid for lower-order data. For example, in the example shown in FIG. 3, "calibration" included in the work information is higher-order data and "2016 Aug. 3,""2017 Aug. 10," or "2018 Aug. 7" indicating the implementation date thereof is lower-order data. Thus, when "available reference" is set as "right to access" for "calibration" included in the work information, content of "2016 Aug. 3," "2017 Aug. 10," or "2018 Aug. 7" indicating the implementation date thereof can also be referred to.

When attributes of the same type having different content are set for higher-order data and lower-order data of the work data, content of the attribute set in the lower-order data becomes valid. For example, in the example shown in FIG. 3, when "available reference" is set as "right to access" for the work information which is the higher-order data and "unavailable reference" is set as the "right to access" for "adjustment" which is the lower-order data," "adjustment" cannot be referred to. Whether or not the attribute set in the higher-order data of the work data is valid for the lower-order data can be selected.

All attributes can be set for each of a terminal, a user, a location, and a period. The terminal is an on-site work terminal apparatus 10 or a management work terminal apparatus 20 and all attributes can be set for each unique number assigned to the terminal. The user is an on-site worker FW using the on-site work terminal apparatus 10 or a management worker MW using the management work terminal apparatus 20 and all attributes can be set for each login account.

The location is a location where the on-site work terminal apparatus 10 or the management work terminal apparatus 20 is used and all attributes can be set for each of the inside of a plant, an office, a fixed-point position, and the like. The period is a period during which the on-site work terminal apparatus 10 or the management work terminal apparatus 20 can be used. For example, all attributes can be set for a limited period from 2020 Nov. 8 to 2020 Nov. 15.

The processor 14 controls an operation of the on-site work terminal apparatus 10 in a centralized manner on the basis of an operation instruction input from the operator 11. The processor 14 includes an executor 14a and an attribute manager 14b, causes various types of operations to be executed on the field device FD, causes the obtained work data to be stored as work data WD1 in the storage 13, and sets the attribute in the work data WD1. The attributes may be set when the work data is stored in the storage 13 or may be set after the work data is stored in the storage 13.

The executor 14a controls the communicator 15 to acquire parameters set in the field device FD, set the parameters for the field device FD, calibrate the field device FD, and the like. For example, the executor 14a acquires specific information (basic information, measured values, set values, and the like) from the field device FD. The executor 14a executes and controls calibration (for example, pressure calibration, temperature calibration, and the like) of the field device FD, and causes the storage 13 to store results thereof as the work data WD1.

The attribute manager 14b includes an attribute setter 14b-1 (a setter) and an attribute interpreter 14b-2 (an extractor) and manages the attribute set in the work data WD1 using the attribute table TB stored in the storage 13. The attribute setter 14b-1 sets any attribute for the work data WD1 or cancels the attribute set in the work data WD1.

The attribute setter 14b-1 may set the attributes when the work data is stored in the storage 13 or may set the attributes after the work data is stored in the storage 13. The attribute setter 14b-1 may set or cancel the attribute on the basis of the instruction from the operator 11 or may set or cancel the attribute on the basis of a prescribed guideline.

The attribute interpreter 14b-2 extracts work data in which a specific attribute is set by interpreting the attribute set in the work data WD1. For example, the attribute interpreter 14b-2 interprets the attribute set in the work data WD1 on the basis of the instruction from the operator 11, and thereby, work data in which a specific attribute indicated in an instruction from the operator 11 is set is extracted.

Specifically, when the attribute set in the work data WD1 is a management unit attribute indicating the management unit of the field device FD described above, the attribute interpreter 14b-2 extracts work data in which the management unit attribute matching the management unit input from the operator 11 is set. When the attribute set in the work data WD1 is the handling attribute that defines the handling of the work data WD1 described above, the attribute interpreter 14b-2 extracts work data in which the handling attribute indicating that the handling is possible is set.

The communicator 15 communicates with the field device FD connected via the cable C under the control of the processor 14. The communicator 16 performs communication via the network N under the control of the processor 14. For example, when the address of the work data storage apparatus 30 is set in the attribute "output destination" shown in FIG. 4, the communicator 16 performs communication with the work data storage apparatus 30 via the network N under the control of the processor 14.

The input/output 17 inputs/outputs various types of information under the control of the processor 14. For example, the input/output 17 may input/output various types of information by reading or writing various information from or to a removable storage medium (for example, a non-volatile memory such as a USB memory). When the storage medium mounted on the input/output 17 is set in the attribute "output destination" shown in FIG. 4, the input/output 17 performs input/output to/from the mounted storage medium.

For example, the functions of the on-site work terminal apparatus 10 (for example, the functions of the executor 14a and the attribute manager 14b implemented in the processor 14) are implemented by software when a program for implementing the functions (for example, including a program (not shown) stored in the storage 13) is installed. That is, the functions of the on-site work terminal apparatus 10 are implemented by software and hardware resources in cooperation. Such functions of the on-site work terminal apparatus 10 are implemented, for example, by a hardware processor (computer) such as a Central Processing Unit (CPU) executing a program (software).

The program for implementing the functions of the on-site work terminal apparatus 10 may be distributed in a state in which the program is recorded in a computer-readable storage medium such as a CD-ROM or a DVD (registered trademark)-ROM or may be distributed via a network such as the Internet. The functions of the on-site work terminal apparatus 10 may be implemented using hardware such as a field-programmable gate array (FPGA), large-scale integration (LSI) circuit, or an application specific integrated circuit (ASIC).

<Management Work Terminal Apparatus>

Figure 5:
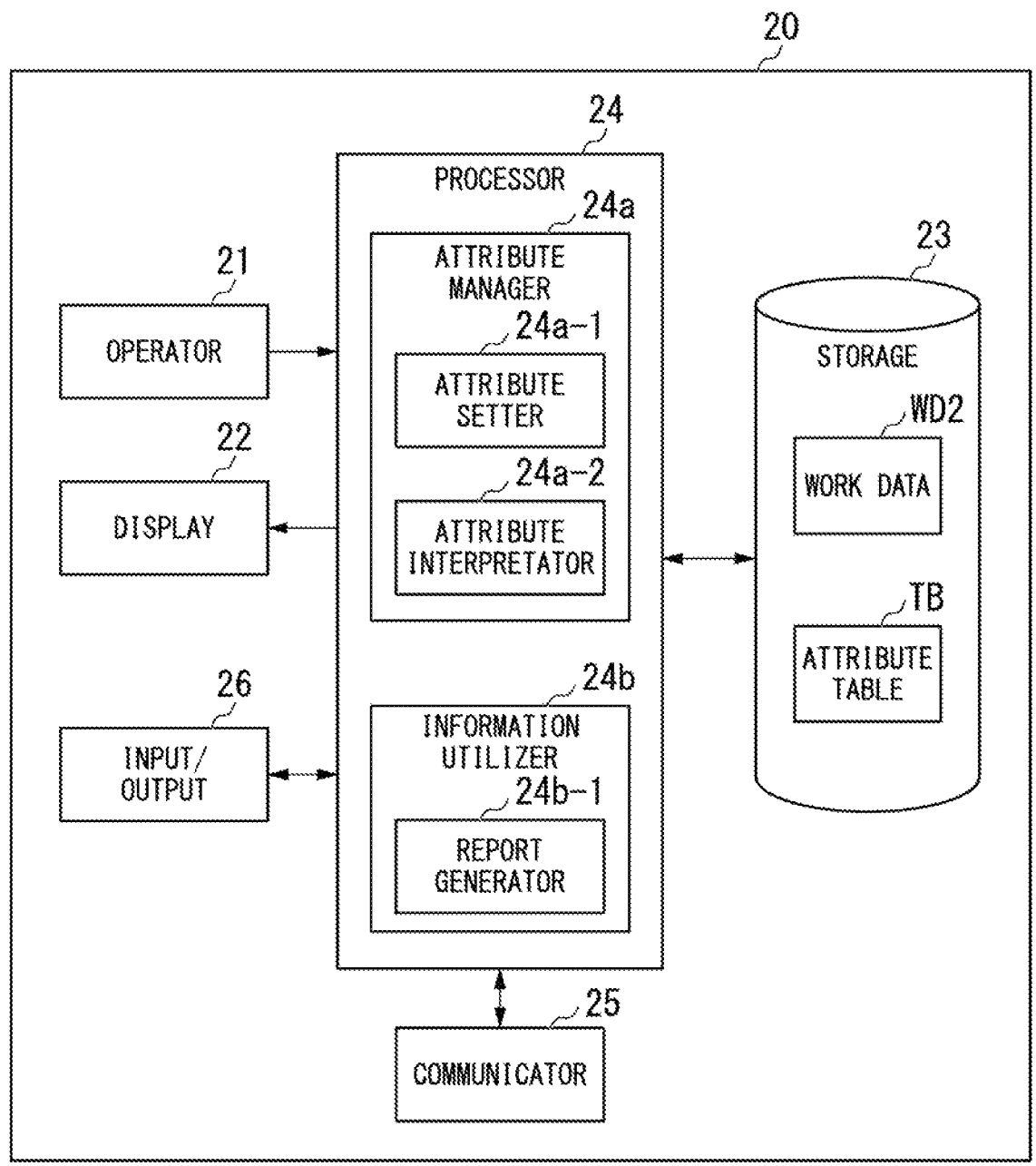
FIG. 5 is a block diagram showing a main configuration of a management work terminal apparatus according to the first embodiment of the present invention.

FIG. 5 is a block diagram showing a main configuration of the management work terminal apparatus according to the first embodiment of the present invention. As shown in FIG. 5, the management work terminal apparatus 20 includes an operator 21, a display 22 (a provider), a storage 23, a processor 24, a communicator 25, and an input/output 26. The management work terminal apparatus 20 is implemented by, for example, a notebook type or desktop type computer.

The operator 21, the display 22, and the storage 23 are similar to the operator 11, the display 12, and the storage 13 included in the on-site work terminal apparatus 10 shown in FIG. 2. Work data WD2 stored in the storage 23 is part of the work data WD1 stored in the storage 13 included in the on-site work terminal apparatus 10 shown in FIG. 2. That is, the work data WD2 is a part of the work data WD1 that has been extracted.

The processor 24 controls the operation of the management work terminal apparatus 20 in a centralized manner on the basis of an operation instruction input from the operator 21. The processor 24 includes an attribute manager 24a and an information utilizer 24b, sets an attribute in the work data WD2, and performs various types of processes for utilizing the work data WD2. Examples of the various types of processes for utilizing the work data WD2 include a process of confirming the on-site work that has been performed, a report generation process, and the like.

The attribute manager 24a is similar to the attribute manager 14b included in the on-site work terminal apparatus 10 shown in FIG. 2 and includes an attribute setter 24a-1 (a setter) and an attribute interpreter 24a-2 (an extractor). The attribute setter 24a-1 sets any attribute for the work data WD2 or cancels the attribute set in the work data WD2. For example, the attribute setter 24a-1 sets or cancels an attribute on the basis of an instruction from the operator 21.

The attribute interpreter 24a-2 extracts work data in which a specific attribute is set by interpreting the attribute set in the work data WD2. For example, the attribute interpreter 24a-2 interprets the attribute set in the work data WD2 on the basis of the instruction from the operator 21, and thereby, work data in which a specific attribute indicated in the instruction from the operator 21 is set is extracted.

The information utilizer 24b includes a report generator 24b-1. The report generator 24b-1 performs a report generation process using the work data WD2 stored in the storage 23 on the basis of the instruction from the operator 21. For example, the report generator 24b-1 generates a report using data in which the attribute "report output" is set within the work data WD2 stored in the storage 23. The information utilizer 24b also performs a process of confirming the on-site work, which has been performed, on the basis of the instruction from the operator 21.

The communicator 25 performs communication via the network N under the control of the processor 24. For example., the communicator 25 communicates with the work data storage apparatus 30 via the network N and acquires work data stored in the work data storage apparatus 30 (work data output from the on-site work terminal apparatus 10). The input/output 26 inputs/outputs various types of information under the control of the processor 24. For example, the input/output 26 may input/output various types of information by reading or writing various types of information from or to a removable storage medium (for example, a non-volatile memory such as a USB memory).

For example, the functions of the management work terminal apparatus 20 (for example, the functions of the attribute manager 24a and the information utilizer 24b implemented by the processor 24) are implemented by software when a program for implementing the functions (for example, including a program (not shown) stored in the storage 23) is installed. That is, the functions of the management work terminal apparatus 20 are implemented by software and hardware resources in cooperation. Such functions of the management work terminal apparatus 20 are implemented, for example, by a hardware processor (computer) such as a CPU executing a program (software).

The program for implementing the functions of the management work terminal apparatus 20 may be distributed in a state in which the program is recorded in a computer-readable storage medium such as a CD-ROM or a DVD (registered trademark)-ROM or may be distributed via a network such as the Internet. The functions of the management work terminal apparatus 20 may be implemented using hardware such as a field-programmable gate array (FPGA), a large-scale integration (LSI) circuit, or an application specific integrated circuit (ASIC).

<Work Assistance Method>

Figure 6A:
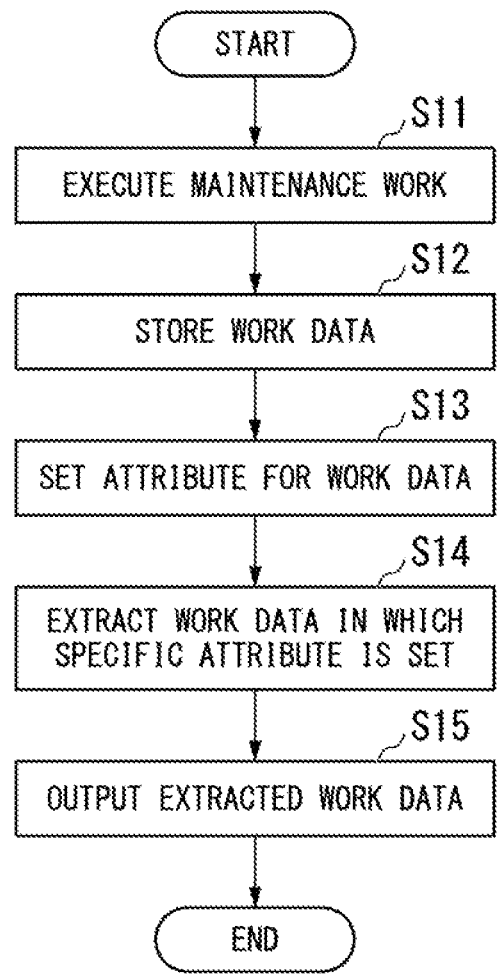
FIG. 6A is a flowchart showing a work assistance method according to the first embodiment of the present invention.
Figure 6B:
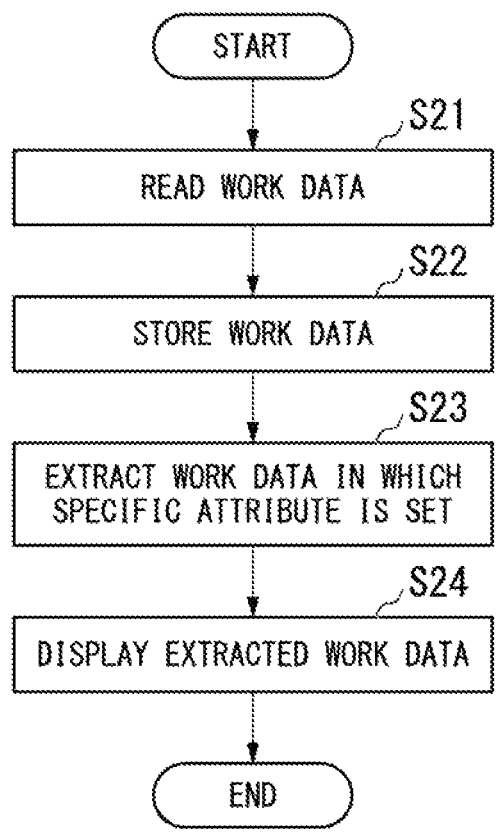
FIG. 6B is a flowchart showing a work assistance method according to the first embodiment of the present invention.

Each of FIGS. 6A and 6B is a flowchart showing a work assistance method according to the first embodiment of the present invention. FIG. 6A is a flowchart showing an example of an operation of the on-site work terminal apparatus 10 and FIG. 6B is a flowchart showing an example of an operation of the management work terminal apparatus 20. The flowchart shown in FIG. 6A is started when the on-site worker FW issues an instruction for starting the maintenance work to the operator 11 of the on-site work terminal apparatus 10.

When the process of the flowchart shown in FIG. 6A is started, the maintenance work of the field device FD using the on-site work terminal apparatus 10 is first executed (step S11). Specifically, in a state where the on-site work terminal apparatus 10 is connected to the field device FD through the cable C, the executor 14*a* of the on-site work terminal apparatus 10 controls the communicator 15 and performs confirmation of a parameter set in the field device FD, setting of a parameter for the field device FD, a predetermined test, predetermined adjustment, and the like.

Next, the processor 14 performs a process of storing work data indicating work content of the maintenance work performed in step S11 as the work data WD1 in the storage 13 (step S12). As shown in FIG. 3, the work data WD1 is data in which basic device information, history information, and work information are associated with the device name of the field device FD. Thus, the processor 14 stores the work data indicating the work content of the maintenance work performed in step S11 in association with the device name of the field device FD.

The process of setting the attribute for the work data WD1 stored in the storage 13 is performed by the attribute setter 14*b*-1 (step S13). Although an example in which the attribute is set for the work data WD1 stored in the storage 13 will be described so that understanding is facilitated, the attribute may be set when the work data is stored in the storage 13. An attribute setting process of the attribute setter 14*b*-1 may be performed on the basis of, for example, an instruction from the operator 11. Alternatively, the attribute setting process may be performed on the basis of a prescribed guideline.

For example, the attribute "installation location" is set for the device name of the field device FD shown in FIG. 3 on the basis of the instruction from the operator 11. Specific examples of the attribute "installation location" include a "ZZ unit in a YY area in an XX plant." The on-site worker FW who uses the on-site work terminal apparatus 10 may input characters of the above attribute one by one by operating the operator 11 or may select the attribute from among candidates of the "installation location" provided in advance.

When the above process is completed, a process of extracting work data in which a specific attribute is set is performed (step S14). This process is performed, for example, by the on-site worker FW inputting a specific attribute to the operator 11 of the on-site work terminal apparatus 10 and then issuing an extraction start instruction. When a specific attribute is input from the operator 11 and an extraction start instruction is issued, the process of extracting the work data in which the specific attribute is set by interpreting the attribute set in the work data WD1 is performed by the attribute interpreter 14*b*-2.

For example, it is assumed that the on-site worker FW inputs the above-described "ZZ unit in the YY area in the XX plant" and then issues an extraction start instruction. The attribute interpreter 14*b*-2 performs a process of extracting the work data in which the "ZZ unit in the YY area in the XX plant" is set as the attribute "installation location" from the work data WD1 stored in the storage 13.

The process of outputting the extracted work data is performed by the processor 14 (step S15). For example, when the address of the work data storage apparatus 30 is set as the output destination of the extracted work data, the processor 14 controls the communicator 16 to perform a process of transmitting the extracted work data to the work data storage apparatus 30 via the network N. The work data transmitted via the network N is stored in the work data storage apparatus 30. According to the above process, a series of processing steps of the flowchart shown in FIG. 6A is completed.

The flowchart shown in FIG. 6B is started when the management worker MW issues an instruction for reading the work data to the operator 21 of the management work terminal apparatus 20. When the process of the flowchart shown in FIG. 6B is started, a process of reading the work data output from the on-site work terminal apparatus 10 is first performed by the processor 24 of the management work terminal apparatus 20 (step S21). For example, the processor 24 controls the communicator 25 to perform a process of reading the work data stored in the work data storage apparatus 30.

It is also possible to read only the necessary work data from the work data stored in the work data storage apparatus 30. For example, when the management worker MW issues an instruction for reading the work data to the operator 21 of the management work terminal apparatus 20, a specific attribute is input. The attribute interpreter 24*a*-2 performs a process of extracting the work data in which the specific attribute is set by interpreting the attribute set in the work data stored in the work data storage apparatus 30 reading only the extracted work data.

Next, the processor 24 performs a process of storing the work data read in step S21 as work data WD2 in the storage 23 (step S22). When the attribute interpreter 24*a*-2 has performed a process of extracting work data in which a specific attribute is set from the work data stored in the work data storage apparatus 30, the processor 24 performs a process of storing the extracted work data as the work data WD2 in the storage 23.

When the above process is completed, a process of extracting work data in which a specific attribute is set is performed (step S23). This process is performed, for example, by the management worker MW inputting a specific attribute to the operator 21 of the management work terminal apparatus 20 and then issuing an extraction start instruction. When the specific attribute is input from the operator 21 and the extraction start instruction is issued, the attribute interpreter 24a-2 performs a process of extracting the work data in which the specific attribute is set by interpreting the attribute set in the work data WD2.

The extracted work data is output to the display 22 by the processor 24. Thereby, the work data extracted in step S23 is displayed on the display 22 (step S24). For example, in step S23, when the management worker MW inputs the attribute "report output" to the operator 21 of the management work terminal apparatus 20 and then issues an extraction start instruction, the work data required for report generation is displayed on the display 22. Thereby, the management worker MW can accurately select the information to be described in the report generation when the report is generated using the function of the report generator 24b-1. According to the above process, a series of processing steps of the flowchart shown in FIG. 6B is completed.

As described above, in the present embodiment, in the on-site work terminal apparatus 10, work data indicating the maintenance work performed on the field device FD is stored, at least one attribute among a plurality of prescribed attributes is set for the stored work data WD1, work data in which a specific attribute is set is extracted by interpreting the attribute set in the work data WD1. The extracted work data is displayed in the management work terminal apparatus 20. If necessary, the management work terminal apparatus 20 can also extract necessary data from the work data extracted by the on-site work terminal apparatus 10 on the basis of the attributes.

As described above, in the present embodiment, attributes are set in the work data indicating the maintenance work performed on the field device FD and the necessary work data is extracted on the basis of the attributes. Thereby, the management worker MW who performs the management work can easily extract necessary information from the work data indicating the maintenance work performed on the field device FD, and thereby, it is possible to improve work efficiency while preventing an error from occurring in work which is performed in device maintenance.

In the present embodiment, the attributes to be set in the work data can be set for each of a terminal, a user, a location, and a period. Thus, for example, the on-site worker FW can also extract the work data of the work performed on the field device FD for each day on which the work has been performed. Thereby, the management worker MW can easily confirm the on-site work performed every day while avoiding an error without finding the necessary work data from a significant amount of work data.

In the present embodiment, for example, the attribute "installation location" can be set for the work data. The field device FD installed at a specific position can be extracted from the plurality of field device FDs installed in the plant by designating the above installation location. Thereby, even if the same identification information (tag name) is used in a plurality of field device FDs, the work data of each field device FD can be extracted individually.

In the present embodiment, the management work terminal apparatus 20B may acquire only the work data extracted from the work data WD1 in the attribute interpreter 24a-2 as the work data WD2. Thereby, it is possible to minimize a capacity of the storage location of the work data WD2 (a capacity of the storage 23).

Second Embodiment

Figure 7:
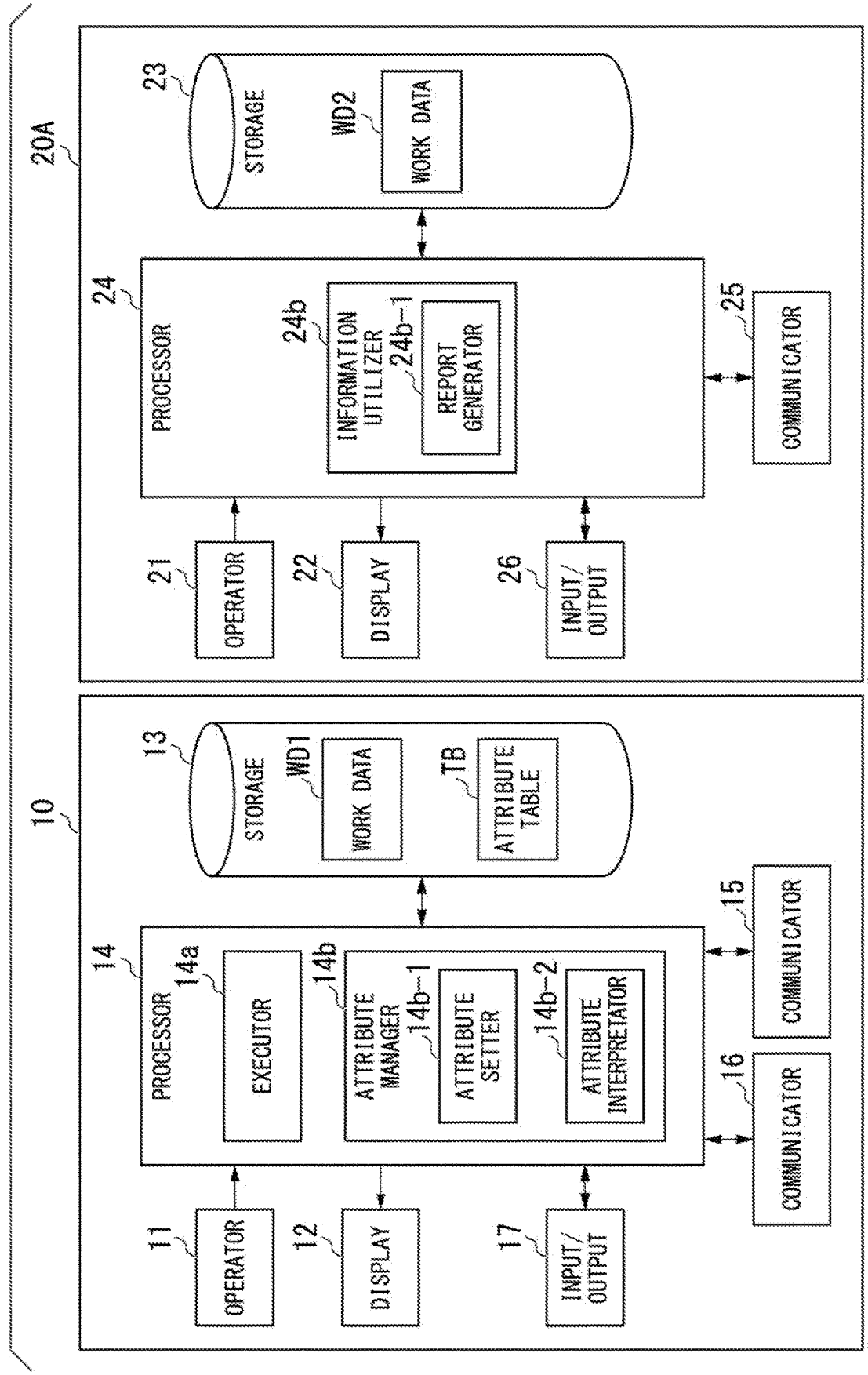
FIG. 7 is a block diagram showing a main configuration of an on-site work terminal apparatus and a management work terminal apparatus provided in a work assistance system according to a second embodiment of the present invention.

FIG. 7 is a block diagram showing a main configuration of an on-site work terminal apparatus and a management work terminal apparatus provided in a work assistance system according to a second embodiment of the present invention. An overall configuration of the work assistance system according to the present embodiment is similar to that shown in FIG. 1. In FIG. 7, the same reference signs are given to components similar to those shown in FIGS. 2 and 5.

As shown in FIG. 7, the work assistance system of the present embodiment includes the on-site work terminal apparatus 10 shown in FIG. 1 and a management work terminal apparatus 20A (a second terminal apparatus). The management work terminal apparatus 20A has a configuration in which the attribute manager 24a and the attribute table TB are omitted from the management work terminal apparatus 20 shown in FIG. 5. That is, the function of setting an attribute for the work data WD2 stored in the storage 23 and extracting the work data in which a specific attribute is set from the work data WD2 stored in the storage 23 in the management work terminal apparatus 20 shown in FIG. 5 is omitted from the management work terminal apparatus 20A of the present embodiment.

In the above-described management work terminal apparatus 20A, content of the work data extracted in the on-site work terminal apparatus 10 is displayed on the display 22. As in the first embodiment, a management worker MW can generate a report using the function of the report generator 24b-1 while referring to content displayed on the display 22. The management worker MW can also confirm the on-site work, which has been performed, with reference to the content displayed on the display 22.

As described above, in the present embodiment, in the on-site work terminal apparatus 10, the storage of work data indicating the maintenance work performed on the field device FD, the setting of the attribute for the stored work data WD1, and the extraction of the work data in which a specific attribute is set are performed. The extracted work data is displayed in the management work terminal apparatus 20A. Thereby, the management worker MW who performs the management work can improve work efficiency while preventing an error from occurring in work which is performed in device maintenance.

Third Embodiment

Figure 8:
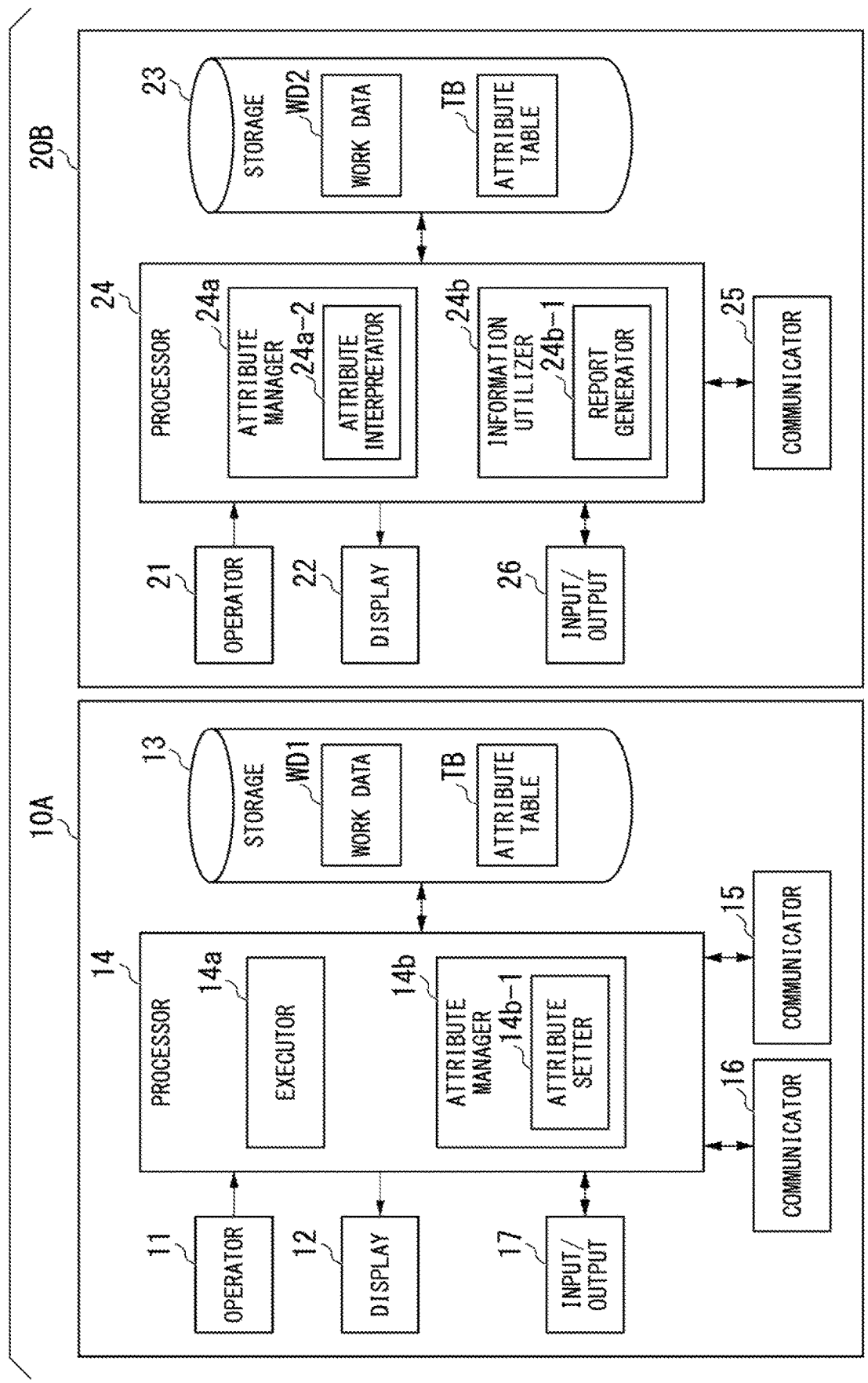
FIG. 8 is a block diagram showing a main configuration of an on-site work terminal apparatus and a management work terminal apparatus provided in a work assistance system according to a third embodiment of the present invention.

FIG. 8 is a block diagram showing a main configuration of an on-site work terminal apparatus and a management work terminal apparatus provided in a work assistance system according to a third embodiment of the present invention. An overall configuration of the work assistance system according to the present embodiments similar to that shown in FIG. 1. In FIG. 8, as in FIG. 7, the same reference signs are given to components similar to those shown in FIGS. 2 and 5.

As shown in FIG. 8, the work assistance system of the present embodiment includes an on-site work terminal apparatus 10A (a first terminal apparatus) and a management work terminal apparatus 20B (a second terminal apparatus). The on-site work terminal apparatus 10A has a configuration in which the attribute interpreter 14b-2 is omitted from the on-site work terminal apparatus 10 shown in FIG. 2. The management work terminal apparatus 20B has a configuration in which the attribute setter 24a-1 is omitted from the management work terminal apparatus 20 shown in FIG. 5.

That is, the function of extracting work data in which a specific attribute is set from the work data WD1 stored in the storage 13 in the on-site work terminal apparatus shown in FIG. 2 is omitted from the on-site work terminal apparatus 10A of the present embodiment. The function of setting attributes for the work data WD2 stored in the storage 23 in the management work terminal apparatus 20 shown in FIG. 5 is omitted from the management work terminal apparatus 20B of the present embodiment.

In the above-described on-site work terminal apparatus 10A, an attribute is set for the work data WD1 and the work data WD1 for which the attribute is set is output in units of field devices FD. In the management work terminal apparatus 20B, the work data WD1 output from the on-site work terminal apparatus 10A is acquired as work data WD2, work data in which a specific attribute is set is extracted from the acquired work data WD2, and the extracted work data is displayed on the display 22. The management work terminal apparatus 20B may acquire only the work data extracted from the work data WD1 in the attribute interpreter 24a-2 as the work data WD2. Thereby, it is possible to minimize a capacity of the storage location of the work data WD2.

In the present embodiment, as in the first and second embodiments, a management worker MW can generate a report using the function of the report generator 24b-1 while referring to content displayed on the display 22. The management worker MW can also confirm the on-site work, which has been performed, with reference to the content displayed on the display 22.

As described above, in the present embodiment, in the on-site work terminal apparatus 10A, the work data indicating the maintenance work performed on the field device FD is stored and the attribute for the stored work data WD1 is set. In the management work terminal apparatus 20B, the work data in which the specific attribute is set is extracted and the extracted work data is displayed. Thereby, the management worker MW who performs the management work can improve work efficiency while preventing an error from occurring in work which is performed in device maintenance.

Fourth Embodiment

Figure 9:
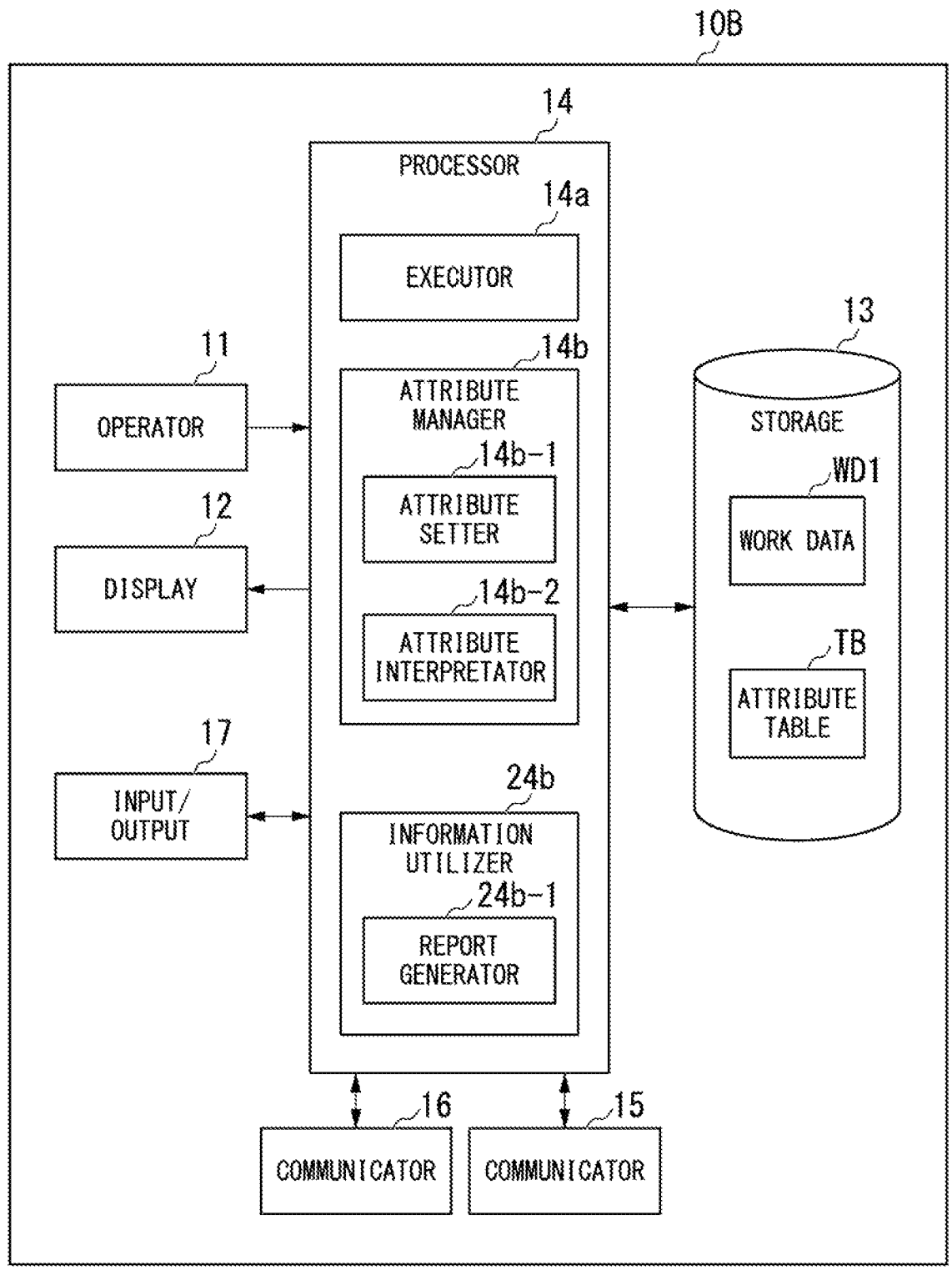
FIG. 9 is a block diagram showing a main configuration of an on-site work terminal apparatus according to a fourth embodiment of the present invention.

FIG. 9 is a block diagram showing a main configuration of an on-site work terminal apparatus according to a fourth embodiment of the present invention. An overall configuration of the work assistance system according to the present embodiment is similar to that shown in FIG. 1. In FIG. 9, the same reference signs are given to components similar to those shown in FIGS. 2 and 5.

As shown in FIG. 9, an on-site work terminal apparatus 10B (a work assistance apparatus) of the present embodiment has a configuration in which an information utilizer 24b is provided in the processor 14 of the on-site work terminal apparatus 10 shown in FIG. 1. That is, the on-site work terminal apparatus 10B of the present embodiment has a configuration in which the function of the management work terminal apparatus 20 shown in FIG. 5 is provided in the on-site work terminal apparatus 10 shown in FIG. 2. In the above-described on-site work terminal apparatus 10B, it is possible to perform the storage of work data obtained from a field device FD, the setting and cancellation of an attribute for the work data, the extraction of work data in which a specific attribute is set, the display of the extracted work data, the generation of a report, and the like using a single apparatus.

As described above, in the present embodiment, in the on-site work terminal apparatus 10B, the storage of work data indicating maintenance work performed on the field device FD, the setting of an attribute for stored work data WD1, the extraction of work data in which a specific attribute is set, and the display of the extracted work data are performed. Thus, the on-site worker FW can perform not only the on-site work but also the management work. In the management work, because the work data in which a specific attribute is set is displayed, it is possible to improve work efficiency while preventing an error from occurring in work which is performed in device maintenance.

Fifth Embodiment

Figure 10:
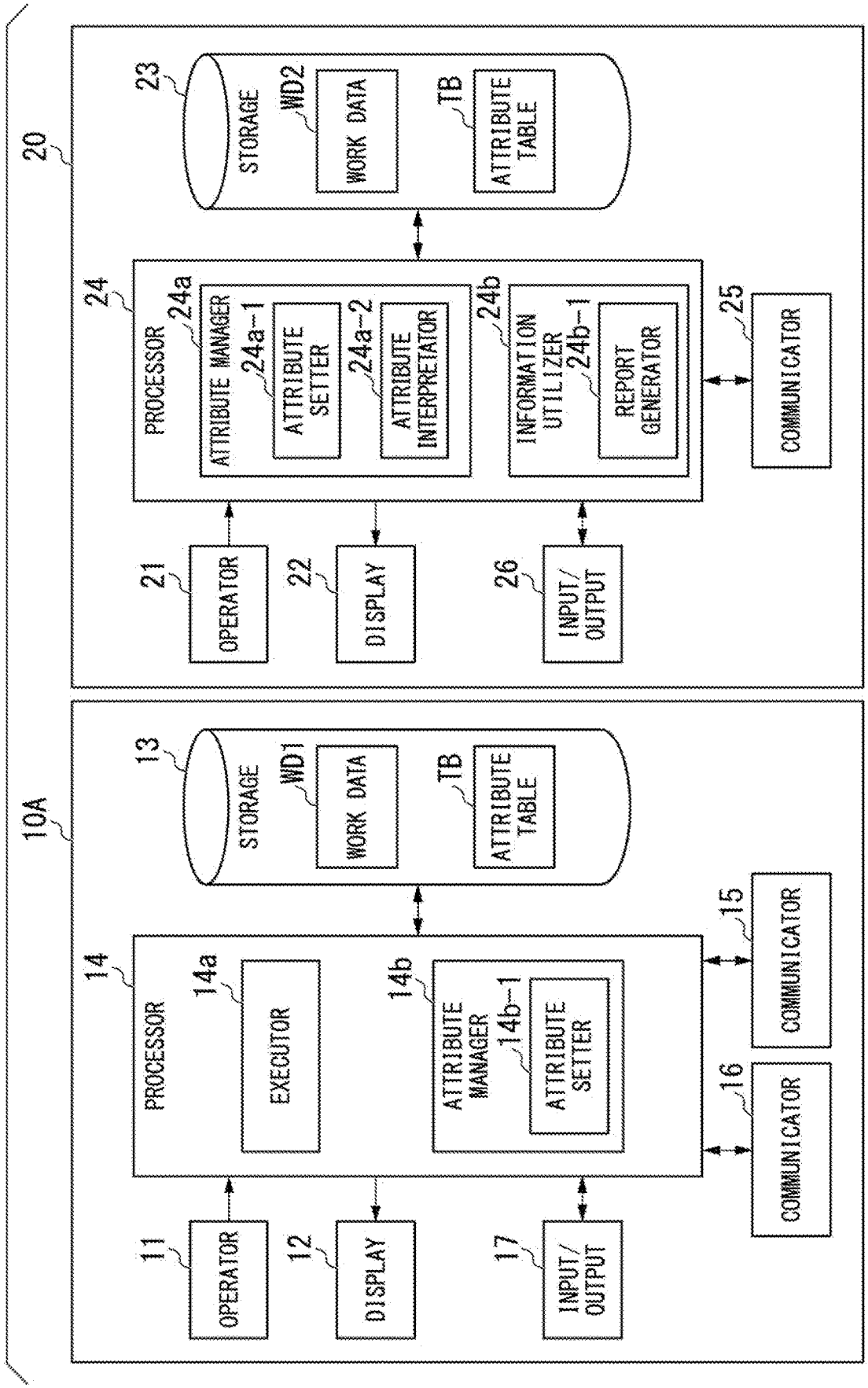
FIG. 10 is a block diagram showing a main configuration of an on-site work terminal apparatus and a management work terminal apparatus provided in a work assistance system according to a fifth embodiment of the present invention.

FIG. 10 is a block diagram showing a main configuration of an on-site work terminal apparatus and a management work terminal apparatus provided in a work assistance system according to a fifth embodiment of the present invention. An overall configuration of the work assistance system according to the present embodiment is similar to that shown in FIG. 1. In FIG. 10, the same reference signs are given to components similar to those shown in FIGS. 5 and 8.

As shown in FIG. 10, the work assistance system of the present embodiment has a configuration in which the management work terminal apparatus 20B provided in the work assistance system of the third embodiment shown in FIG. 8 is used instead of the management work terminal apparatus 20 shown in FIG. 5. That is, the work assistance system of the present embodiment has a function of setting an attribute for work data WD2 stored in the storage 23 (the attribute setter 24a-1) in the management work terminal apparatus 20B shown in FIG. 8.

In the work assistance system of the third embodiment shown in FIG. 8, it is not possible to set an attribute for the work data WD2 stored in the storage 23 in the management work terminal apparatus 20B. On the other hand, in the present embodiment, because the management work terminal apparatus 20 shown in FIG. 5 is provided instead of the management work terminal apparatus 20B, it is possible to set an attribute for the work data WD2 stored in the storage 23 in the management work terminal apparatus 20.

As described in the first embodiment, the management work terminal apparatus 20 can acquire only work data extracted from the work data WD1 in the attribute interpreter 24a-2 as the work data WD2. Thereby, it is possible to minimize a capacity of the storage location of the work data WD2.

As described above, in the present embodiment, in the on-site work terminal apparatus 10A, the work data indicting the maintenance work performed on the field device FD is stored and an attribute for the stored work data WD1 is set. In the management work terminal apparatus 20, the work data in which a specific attribute is set is extracted, the extracted work data is displayed, and an attribute for the stored work data WD2 can also be set. Thereby, a management worker MW who performs the management work can improve work efficiency while preventing an error from occurring in work which is performed in device maintenance.

Sixth Embodiment

Figure 11:
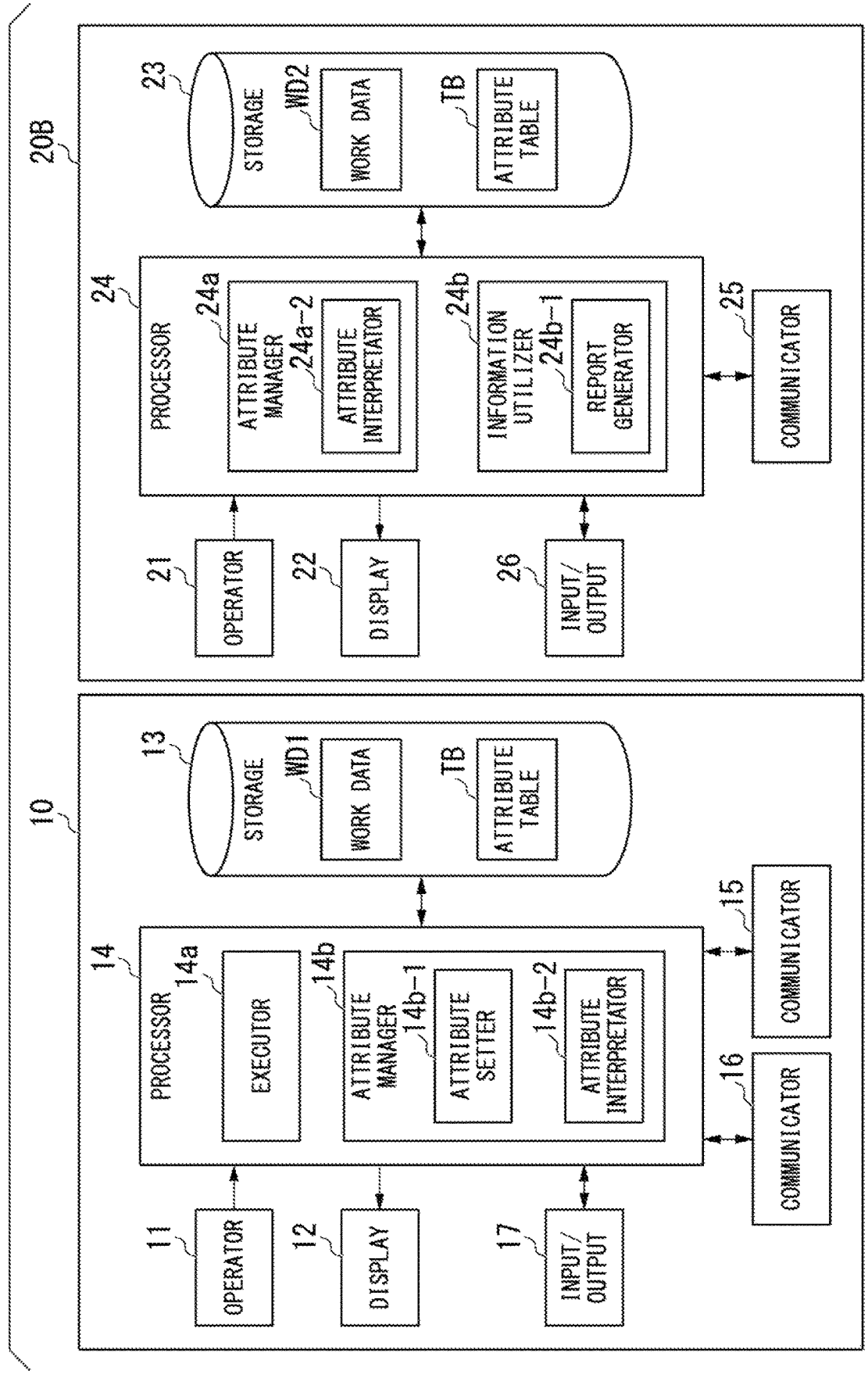
FIG. 11 is a block diagram showing a main configuration of an on-site work terminal apparatus and a management work terminal apparatus provided in a work assistance system according to a sixth embodiment of the present invention.

FIG. 11 is a block diagram showing a main configuration of an on-site work terminal apparatus and a management work terminal apparatus provided in a work assistance system according to a sixth embodiment of the present invention. An overall configuration of the work assistance system according to the present embodiment is similar to that shown in FIG. 1. In FIG. 11, the same reference signs are given to components similar to those shown in FIGS. 2 and 8.

As shown in FIG. 11, the work assistance system of the present embodiment has a configuration in which the on-site work terminal apparatus 10A provided in the work assistance system of the third embodiment shown in FIG. 8 is used instead of the on-site work terminal apparatus 10 shown in FIG. 2. That is, the work assistance system of the present embodiment has a function of extracting work data in which a specific attribute is set by interpreting an attribute set in work data WD1 (the attribute interpreter 14*b*-2) in the on-site work terminal apparatus 10A shown in FIG. 8.

In the work assistance system of the third embodiment shown in FIG. 8, the work data WD1 in which an attribute is set is output from the on-site work terminal apparatus 10A in units of field devices FD. On the other hand, in the present embodiment, because the on-site work terminal apparatus 10 is provided instead of the on-site work terminal apparatus 10A, it is possible to extract work data in which a specific attribute is set from the work data WD1 stored in the storage 13 and output the extracted work data.

As described in the first embodiment, the management work terminal apparatus 20 can acquire only the work data extracted from the work data WD1 in the attribute interpreter 24*a*-2 as the work data WD2. Thereby, it is possible to minimize a capacity of the storage location of the work data WD2.

As described above, in the present embodiment, in the on-site work terminal apparatus 10, the work data indicating the maintenance work performed on the field device FD is stored, an attribute for the stored work data WD1 is set, and work data in which a specific attribute is set is extracted. In the management work terminal apparatus 20B, the work data in which the specific attribute is set is extracted and the extracted work data is displayed. Thereby, a management worker MW who performs the management work can improve work efficiency while preventing an error from occurring in work which is performed in device maintenance.

Although the work assistance system, the work assistance apparatus, work assistance method, and the storage medium according to the embodiments of the present invention have been described above, the present invention is not limited to the above-described embodiments and may be freely changed without departing from the scope of the present invention. For example, in the above-described embodiments, the work data output from the on-site work terminal apparatuses 10 and 10A is stored as the work data WD2 in the storage 23 of the management work terminal apparatuses 20, 20A, and 20B. However, in the management work terminal apparatuses 20, 20A, and 20B, the work data output from the on-site work terminal apparatuses 10 and 10A may be displayed on the display 22 without being stored or may be utilized in the information utilizer 24*b*.

What is claimed is:

1. A work assistance system comprising a first terminal apparatus and a second terminal apparatus, the first terminal apparatus being portable by an on-site worker who performs on-site work of device maintenance and for maintaining a field device, the second terminal apparatus being for use in management work of the device maintenance, wherein the first terminal apparatus comprises:
a storage storing work data for each of a plurality of devices, the work data indicating work performed to maintain the plurality of devices, the work data being data in which work information indicating content of the work performed to maintain the plurality of devices is associated with identification information for identifying the plurality of devices, the work information including higher-order data and lower-order data, the higher-order data indicating the work performed to maintain the plurality of devices, the lower-order data indicating date and time when the work has been performed; and a processor configured to execute a program to:
among a plurality of prescribed attributes including a first attribute indicating a management unit of the plurality of devices and a second attribute for defining handling of the work data, set the first attribute with respect to the identification information of the work data stored in the storage and set the second attribute with respect to at least one of the identification information or the work information of the work data stored in the storage;

interpret the first attribute and the second attribute set in the work data and to extract work data in which a specific attribute is set, the second attribute set in the higher-order data being valid for the lower-order data; and provide the extracted work data, wherein the work assistance system further comprises a storage apparatus storing the work data in which the attribute is set output from the first terminal apparatus, and wherein the second terminal apparatus is configured to read the work data stored in the storage apparatus.

2. The work assistance system according to claim 1, wherein, in a case where the attribute set in the work data is the first attribute, the processor is configured to execute the program to extract the work data in which the first attribute matching an input management unit is set.

3. The work assistance system according to claim 1, wherein, in a case where the attribute set in the work data is the second attribute, the processor is configured to execute the program to extract the work data in which the second attribute indicating that handling is possible is set.

4. The work assistance system according to claim 1, wherein
the work information indicates content of a plurality of types of work performed to maintain the plurality of devices,
the processor is configured to execute the program to, among the plurality of prescribed attributes, set the second attribute with respect to each of the plurality of types of work in the work information,
in a case where the attribute set in the work data is the first attribute, the processor is configured to execute the program to extract the work data in which the first attribute matching an input management unit is set with respect to the identification information, and
in a case where the attribute set in the work data is the second attribute, the processor is configured to execute the program to extract the work data in which the second attribute indicating that handling is possible is set with respect to each of the plurality of types of work in the work information.

5. A work assistance method using a work assistance system comprising a first terminal apparatus and a second terminal apparatus, the first terminal apparatus being portable by an on-site worker who performs on-site work of device maintenance and for maintaining a field device, the second terminal apparatus being for use in management work of the device maintenance, wherein the work assistance method comprises, by the first terminal apparatus:

stroring work data for each of a plurality of devices, the work data indicating work performed to maintain the plurality of devices, the work data being data in which work information indicating content of the work performed to maintain the plurality of devices is associated with identification information for identifying the plurality of devices, the work information including higher-order data and lower-order data, the higher-order data indicating the work performed to maintain the plurality of devices, the lower-order data indicating date and time when the work has been performed;

among a plurality of prescribed attributes including a first attribute indicating a management unit of the plurality of devices and a second attribute for defining handling of the work data, setting the first attribute with respect to the identification information of the stored work data and setting the second attribute with respect to at least one of the identification information or the work information of the stored work data;

interpreting the first attribute and the second attribute set in the work data and extracting work data in which a specific attribute is set, the second attribute set in the higher-order data being valid for the lower-order data; and providing the extracted work data, wherein the work assistance system further comprises a storage apparatus storing the work data in which the attribute is set output from the first terminal apparatus, and wherein the work assistance method further comprises, by the second terminal apparatus, reading the work data stored in the storage apparatus.

6. A non-transitory computer-readable storage medium storing a work assistance program for a work assistance system comprising a first terminal apparatus and a second terminal apparatus, the first terminal apparatus being portable by an on-site worker who performs on-site work of device maintenance and for maintaining a field device, the second terminal apparatus being for use in management work of the device maintenance, wherein the work assistance program causes a computer of the first terminal apparatus to perform:

storing work data for each of a plurality of devices, the work data indicating work performed to maintain the plurality of devices, the work data being data in which work information indicating content of the work performed to maintain the plurality of devices is associated with identification information for identifying the plurality of devices, the work information including higher-order data and lower-order data, the higher-order data indicating the work performed to maintain the plurality of devices, the lower-order data indicating date and time when the work has been performed;

among a plurality of prescribed attributes including a first attribute indicating a management unit of the plurality of devices and a second attribute for defining handling of the work data, setting the first attribute with respect to the identification information of the stored work data and setting the second attribute with respect to at least one of the identification information or the work information of the stored work data;

interpreting the first attribute and the second attribute set in the work data and extracting work data in which a specific attribute is set, the second attribute set in the higher-order data being valid for the lower-order data; and providing the extracted work data, wherein the work assistance system further comprises a storage apparatus storing the work data in which the attribute is set output from the first terminal apparatus, and wherein the work assistance program causes a computer of the second terminal apparatus to perform reading the work data stored in the storage apparatus.

* * * * *